Nov. 25, 1930.  W. J. PEARCE  1,783,096
BUTTER CUTTING MACHINE
Filed Oct. 31, 1928  2 Sheets-Sheet 2
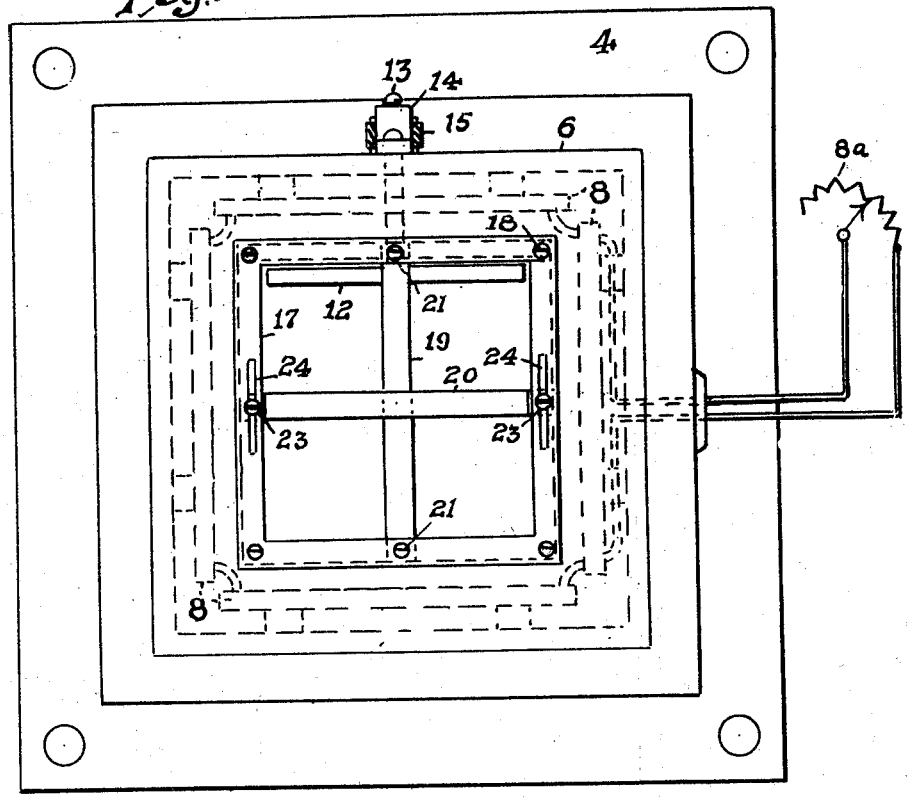
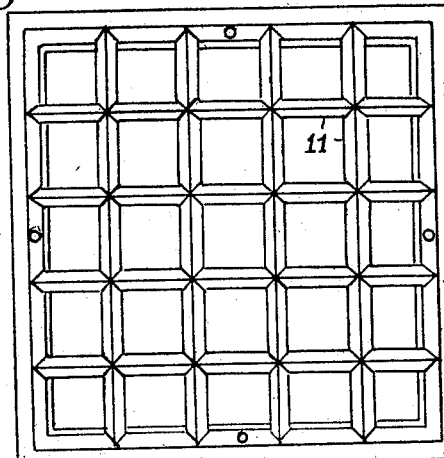
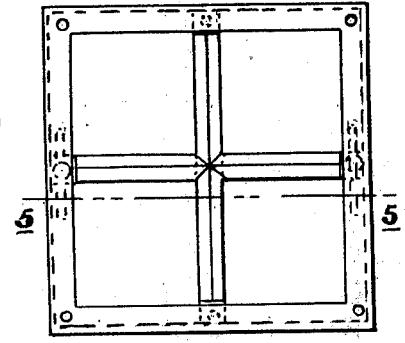
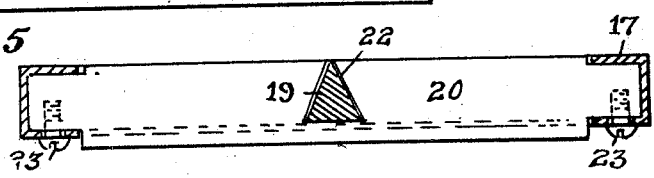
INVENTOR
William J. Pearce,
by Edward A. Lawrence
his attorney.

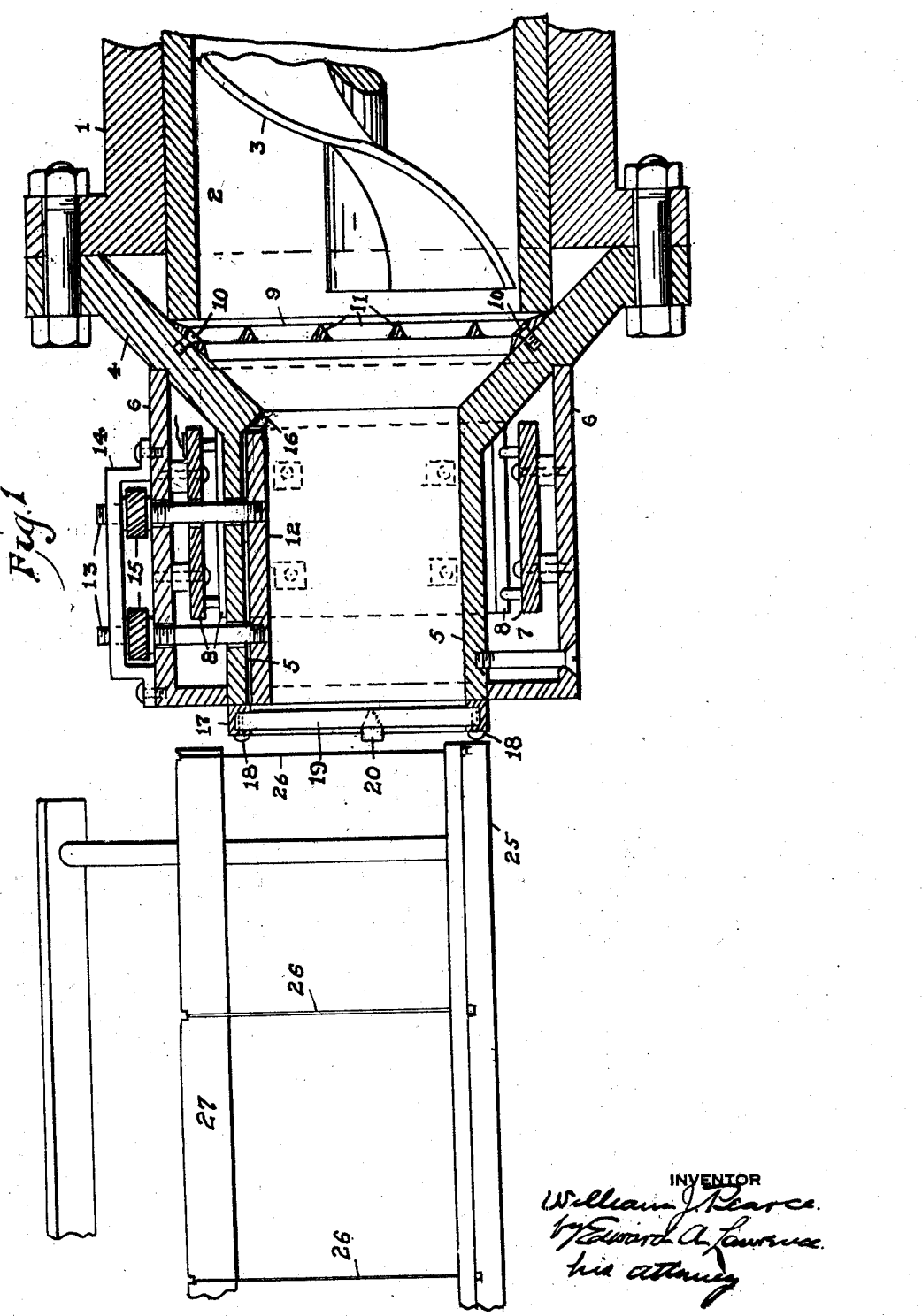

Patented Nov. 25, 1930

1,783,096

UNITED STATES PATENT OFFICE

WILLIAM J. PEARCE, OF McKEESPORT, PENNSYLVANIA

BUTTER-CUTTING MACHINE

Application filed October 31, 1928. Serial No. 316,273.

Such machines are employed for cutting up masses of butter into smaller masses of predetermined size and weight, such as pound prints, and usually comprise a molding head through which the butter is forced, as by a screw conveyer, and from which the butter issues in the form of a continuous bar, which bar is then sliced transversely by a cutting mechanism to produce the desired length of print.

In the commercial use of butter cutting machines a number of serious faults have appeared which have not hitherto been correctable.

Among these faults may be mentioned the following.

First, the masses of butter fed to the cutting machine are not of uniform density but contain numerous internal pockets or cavities full of air or water.

The cutting machines now in use provide no means for eliminating these pockets, and therefore the prints produced, although they may be reasonably uniform in dimensions, vary materially in weight.

Careful tests reveal that the prints are almost invariably more or less underweight, and in some factories it is the custom to add additional butter to the prints to compensate for this deficiency.

Second, the butter as it moves in contact with the walls of the throat of the molding head tends to adhere thereto with the result that the surfaces of the issuing bar are rough and torn, presenting an unattractive appearance, causing additional variations in weight, and also permitting unnecessary evaporation of the moisture content of the butter with a consequent loss of weight.

Third, the throat of the molding head has hitherto been provided with refining walls in fixed relation to each other, and thus it has been impossible to accurately adjust the cross-sectional area of the throat to produce uniformity of weight in prints of uniform length cut from the bar.

Fourth, the issuing bar is sometimes split longitudinally into a plurality of bars of less cross-sectional area, and a taut wire extending transversely of the throat orifice has been employed for that purpose. However, the wires produce rough, torn surfaces, which are objectionable both because of their appearance and because they permit undue evaporation of the moisture from the butter; and moreover the smaller bars thus produced are not sufficiently separated to prevent their adhering together when they are cut transversely into proper print lengths.

To overcome the first mentioned fault I provide means for eliminating the pockets from the butter before it enters the throat of the molding head, thus enabling the production of a bar of uniform density which when cut into uniform lengths will produce prints of uniform weight.

The preferred form of such means is a slicing grid so positioned that the butter is forced through it as it enters the molding head.

To overcome the second mentioned fault I provide means for warming the walls of the throat of the molding head so that the butter moves easily in contact with said walls and has imparted to it a smooth surface which acts as a seal to prevent the escape of moisture from the butter. I provide means for regulating the temperature so that undue melting will not ensue.

The specific means which I provide for overcoming this fault is an electrical heating mechanism surrounding the walls of the throat and preferably contained within the hollow walls of the throat, a rheostat or other suitable device being provided for properly regulating the temperature.

To overcome the third mentioned fault I provide the throat of the molding head with a movable walls or walls and with means for adjusting the positions thereof, whereby the cross-sectional capacity of the throat may be regulated to produce a bar of the proper cross-sectional shape to produce the predetermined weights in the prints cut therefrom.

To remedy the fourth mentioned fault I provide means for splitting the issuing bar longitudinally which produces smooth cut surfaces which also act as a seal against moisture loss, and I also provide means for adjusting such splitting means to obtain accuracy and uniformity in the smaller bars produced by such splitter.

Again my improved splitter is of such character that it spreads the bars apart and thus prevents the subsequent adherence.

Other objects which I have in view, and other novel features of construction, and also of arrangement of parts, will appear from the following description.

In the accompanying drawings, wherein I have illustrated a practical embodiment of the principles of my invention, Fig. 1 is a longitudinal and vertical section of parts of a butter cutting machine to which my invention is applied.

Fig. 2 is a front elevation of the molding head showing the splitter, the slicer being omitted from this view for the sake of clearness.

Fig. 3 is an elevation of the slicer looking from the right in Fig. 1.

Fig. 4 is an elevation of the splitter looking in the same direction.

Fig. 5 is an enlarged section taken along the line 5—5 in Fig. 4.

Referring to the drawings, 1 represents a portion of the worm box of the butter cutting machine, 2 the conveyer barrel which is usually of wood, and 3 the worm conveyer which delivers the butter to and forces it through the molding head 4 which is bolted on the front of the worm box.

The head 4 is provided with the usual forwardly contracting mouth which ends in the throat which is shown as of the usual rectangular or cross-sectional shape. The throat forms the die of the machine in which the column is properly compacted and smoothed.

The throat is provided with inner walls 5 and outer walls 6 between which is the chamber 7 surrounding the throat.

In such chamber on the four sides of the throat I mount the electrical heating units 8 which are preferably solid bars of resistant metal and are connected with the rheostat 8ᵃ for current control so that the inner walls of the throat may be heated to the proper temperature.

Positioned at the mouth of the molding head 4 and at the end of the barrel 2 is the slicing means or grid 9 which is of proper exterior contour to fit in said mouth and be secured in place as by the screws 10. The grid comprises a plurality of intersecting knives 11 which are of wedge cross-sectional shape with their cutting edges disposed toward the barrel.

The knives are sufficient in number to produce relatively small openings or interstices between them through which the butter is forced into the head in the form of a multiplicity of relatively slender columns, thus opening up the pockets in the butter and permitting the escape of their air or water contents.

The forcing together of these columns as the butter travels through the contracting mouth of the head causes them to be compressed into a mass of uniform density, free from pockets or cavities of any kind.

One or more sides of the throat of the molding box 4 is provided with a false inner wall 12 which is carried on the inner ends of a plurality of bolts 13 extending outwardly through the walls 5 and 6 and through a bridge 14 mounted on the outer wall 6. 15 represents nuts screwed on said bolts and held between the bridge 14 and the wall 6, so that by turning said nuts the false wall may be moved toward or away from the axis of the throat, thus permitting accurate adjustment of the capacity of the latter.

The inner wall of the mouth of the head is notched as at 16 so that the end false wall is protected against direct impact of the forwardly moving mass of butter.

At the outer or discharge end of the throat or die of the molding head I may mount my improved splitting device for dividing the issuing bar of butter longitudinally into a plurality of smaller or sub-bars.

Specifically the construction of the splitter is as follows. 17 represents a rectangular frame which is detachably mounted, as by screws 18, against the outer end of the throat.

The frame is formed of channel bar with the flanges turned inwardly toward the center of the frame.

In this frame I mount one or more slicing knives.

I have shown two slicing knives 19 and 20, for slicing the main bar into four smaller bars. In case the main bar is to be sliced into but two smaller bars either the vertical knife 19 or the horizontal knife 20 may be alone employed.

The knives are wedge shape in cross section with the knife edge turned inwardly toward the throat of the molding head.

The vertical knife 19 has its ends inserted in the channel bars and is fixed in place as by means of screws 21 extending through one of the flanges of the frame into a threaded hole in the knife.

The body of the horizontal knife 20 is of greater depth than bar 19 and is provided with a triangular opening 22 at its center through which the knife 19 is slipped, as shown in Fig. 5, so that the bars may be assembled to provide a cruciform knife edge.

The ends of the knife 20 are slidably mounted in the channels of the side of the frame 17 and may be fixed at the desired elevation by means of screws 23 extending through slots 24 in the flanges of the channels and engaging threaded holes in the knife 20.

Thus by loosening the screws 23 the knife 20 may be moved up or down and then be fixed in place by tightening the screws.

The purpose of making the knife 20 adjustable as to its elevation is to enable the cross-sectional areas of the smaller bars formed by splitting to be regulated so that their size may be accurately uniform. It also enables the knife to be adjusted to compensate for the variation in position of the false wall in the throat, thereby insuring uniformity of size in the bars formed by splitting.

The issuing bar or bars move along the table 25 and are cut into proper length to form the desired prints by means of the cutting members 26 of the swinging cutting frame 27.

The wedge shape of the splitting knives 19 and 20 cause the smaller bars to spread apart as they are produced, thus overcoming their tendency to subsequently come into contact and stick together.

The true cutting action of my improved wedge shaped knives produces smooth sealing surfaces of the smaller bars, much superior to the torn rough surfaces caused by the cutting wires used on the present machines.

What I desire to claim is:—

1. The combination with a conveyer barrel and means for forcing butter therethrough, of a head on said barrel having a rectangular frusto-pyramidal portion adjacent the head and a rectangular prismatic throat leading therefrom, said throat having one of its side walls offset outwardly of a side edge of the minor base of the frusto-pyramidal portion to provide a recess, a false wall located normally in said recess, and means to adjust said false wall bodily to and from the opposite throat wall.

2. The combination with a conveyer barrel and means for forcing butter therethrough, of a head on said barrel having a rectangular frusto-pyramidal portion adjacent the head and a rectangular prismatic throat leading therefrom, said throat having one of its side walls offset outwardly of a side edge of the minor base of the frusto-pyramidal portion to provide a recess, a false wall located normally in said recess, and a divider member having a frame provided with inclined walls and fitting the said frusto-pyramidal head portion at the end of the barrel whereby butter issuing from the barrel is first divided longitudinally and is then pressed to force the divided portions together before passing into said throat.

Signed at Pittsburgh, Pa., this 29th day of October, 1928.

WILLIAM J. PEARCE.